(12) United States Patent
Lacaux et al.

(10) Patent No.: US 9,812,860 B2
(45) Date of Patent: Nov. 7, 2017

(54) ELECTRICAL NETWORK OF AN AIRCRAFT

(71) Applicant: THALES, Courbevoie (FR)

(72) Inventors: Frédéric Lacaux, Chatou (FR);
Christophe Bruzy, Chatou (FR);
Pascal Thalin, Chatou (FR)

(73) Assignee: THALES, Courbevoie (FR)

( * ) Notice: Subject to any disclaimer, the term of this patent is extended or adjusted under 35 U.S.C. 154(b) by 301 days.

(21) Appl. No.: 14/815,197

(22) Filed: Jul. 31, 2015

(65) Prior Publication Data
US 2016/0036220 A1    Feb. 4, 2016

(30) Foreign Application Priority Data
Aug. 1, 2014   (FR) .................................. 14 01776

(51) Int. Cl.
| | | |
|---|---|---|
| H02J 1/00 | (2006.01) | |
| B64D 41/00 | (2006.01) | |
| H02J 1/12 | (2006.01) | |
| H02J 9/04 | (2006.01) | |
| H02M 3/04 | (2006.01) | |
| H02M 7/02 | (2006.01) | |
| H02J 3/02 | (2006.01) | |

(52) U.S. Cl.
CPC ............... *H02J 1/00* (2013.01); *B64D 41/00* (2013.01); *H02J 1/12* (2013.01); *H02J 9/04* (2013.01); *H02M 3/04* (2013.01); *H02M 7/02* (2013.01)

(58) Field of Classification Search
CPC ..... B64D 33/00; H02J 3/02; H02J 3/38; H02J 9/04; H02M 3/04; H02M 7/02
USPC .......................................................... 307/9.1
See application file for complete search history.

(56) References Cited

U.S. PATENT DOCUMENTS

| | | |
|---|---|---|
| 2008/0174177 A1 | 7/2008 | Langlois et al. |
| 2011/0273012 A1 | 11/2011 | Tardy |

FOREIGN PATENT DOCUMENTS

| | | |
|---|---|---|
| FR | 2 911 442 A1 | 7/2008 |
| FR | 2 930 084 A1 | 10/2009 |

*Primary Examiner* — Robert Deberadinis
(74) *Attorney, Agent, or Firm* — Baker & Hostetler LLP

(57) ABSTRACT

An electrical network of an aircraft comprises: several main generators, several high voltage direct current networks powered by one of the generators in normal operation, several low voltage direct current networks powered by one of the high voltage direct current networks, several converters to transfer energy from one of the high voltage direct current networks to one of the low voltage direct current networks, the different converters being independent and isolated from each other, each converter being dedicated to one of the high voltage networks and to the low voltage direct current network, a load designed to be powered in normal operation by the main generators and in backup operation by one of the low voltage direct current networks, the backup operation being put into place when at least one of the high voltage networks is no longer powered by the associated main generator in normal operation.

11 Claims, 5 Drawing Sheets

ELECTRICAL NETWORK OF AN AIRCRAFT

CROSS-REFERENCE TO RELATED APPLICATIONS

This application claims priority to foreign French patent application No. FR 1401776, filed on Aug. 1, 2014.

FIELD OF THE INVENTION

The invention concerns the conversion of electric power applied to aeronautical systems and more precisely the implementing of low voltage direct current onboard backup networks making use of batteries. Today, many airplanes use 28 V direct current or 28 V dc networks. These networks are known as LVDC from their abbreviation: Low Voltage Direct Current.

BACKGROUND

The architecture of airplanes is evolving at present toward a broader use of electric energy. The need for a system of conversion and storage of energy is therefore also in the process of evolving due to the electrification of systems customarily utilizing pneumatic or hydraulic energy. The advent of new highly critical applications requiring operation from a normal and/or backup electrical source makes the structure of the electrical networks more complex. These new applications impose new constraints which are hard to reconcile with the current normal and backup electrical networks.

High voltage direct current networks have been implemented aboard modern airplanes. One voltage commonly used is 540 V dc. Voltages of 350 V dc and 270 V dc are also being contemplated. These networks are known as HVDC from their abbreviation: High Voltage Direct Current.

Electrical actuators are being used increasingly, especially for the landing gear brakes or flight controls. Among these, one finds notably electromechanical actuators, or EMAs, electrohydrostatic actuators or EHAs, and electrical backup hydraulic actuators or EBHAs. These actuators are generally powered by a high voltage direct current network HVDC. Furthermore, other types of loads, notably avionic computers, generally make use of a low voltage direct current network. Thus, one feels a need for a hybridization of the types of networks, both in normal and backup operation.

The use of energy storage in the form of 28 V dc batteries is conventional for the electrical networks of airplanes. In normal operation, the batteries are charged by a low voltage direct current or LVDC network, and in backup mode one draws energy here to power the backup networks. The backup low voltage direct current network draws its energy directly from a battery, while a dedicated step-up converter makes it possible to power the high voltage direct current network from a battery. The multiplication of dedicated converters for each system represents a development/maintenance cost and a significant weight. The adoption of advanced conversion techniques such as interleaving or soft switching makes it possible to limit the weight and volume of these networks. However, the costs and weight of these networks remain elevated.

At present, a converter in normal operation is associated with a load. To ensure the backup operation, a second converter is usually added to power the same load. For example, the braking system (or the flight controls) is powered in normal operation directly by the HVDC networks. In backup braking duty or in cases when the main high voltage alternating current or HVAC network is not available, specific backup converters are used to convert the energy coming from the 28 V dc battery and create an HVDC voltage. The braking system is known by the name EBAC for Electrical Brake Actuation Controller.

Likewise, the starting system of the auxiliary power unit or APU is powered in normal operation by a main HVAC network. In the absence of the HVAC network, the starting system of the APU is powered by a LVDC network via a specific LVDC/HVDC step-up converter.

The association of a specific converter for each of the conversion functions associated with the normal and backup electrical brakes, the starting of the APU on battery, the powering of the 28 V dc loads from the main HVAC network presents several drawbacks. The weight of the onboard converters is important due to the lack of optimization of the installed conversion power with regard to the instantaneous need. The weight proportion of the step-up converters is significant, representing nearly 50% of the weight of the complete system. Moreover, the converters are specific to their functions, making the costs of development and maintenance relatively elevated. The extensive use of dedicated converters in the 28 V dc networks represents an important cost and weight for these systems.

Finally, certain applications require an important availability rate which is hard to achieve with a single converter. The loss of the converter represents the loss of the associated load, which thus leads to the use of a backup converter for critical applications, further increasing the associated weight and cost.

In the 28 V dc electrical systems onboard an airplane, the backup and starting systems of the APU make use of dedicated step-up converters to create an HVDC voltage from 28 V dc batteries. These converters operate only during particular phases of flight and during relatively short periods of time. The step-up converters associated with the backup and starting system of the APU thus have a very low utilization ratio. Outside of their short periods of operation, they represent a dead weight to the airplane.

In normal operation, the main conversion system utilizes power converters to transform the main HVAC or HVDC network into regulated 28 V dc. In the case of the HVAC network, the conversion is done in two cycles, HVAC to HVDC and HVDC to 28 V dc. In backup use or when the HVAC network is down, the 28 V dc users are directly powered from batteries, leaving the main HVDC/28 V dc converters unused.

In backup operation or when the main network is down, the EBAC electrical brake or flight control systems utilize dedicated backup converters to convert the energy coming from one of the 28 V dc batteries into HVDC. In a similar manner, when the main HVAC onboard network is down, the starting system of the APU utilizes a dedicated starting converter to convert the energy coming from one of the 28 V dc batteries into HVDC.

SUMMARY OF THE INVENTION

The invention aims to mitigate some or all of the aforementioned problems by proposing an electrical network embarked aboard an airplane which exploits the complementarity of certain applications. These applications are capable of sharing the same conversion resources.

The invention relies on the mutualisation and the dynamic sharing of generic power converters between different consumers, notably those powered from 28 V dc batteries.

For this purpose, the invention involves an electrical network of an aircraft comprising:
several main generators,
several high voltage direct current HVDC networks, each one powered by one of the generators in normal operation,
several low voltage direct current LVDC networks, each one powered by one of the high voltage direct current HVDC networks,
several converters each one making it possible to transfer energy from one of the high voltage direct current HVDC networks to one of the low voltage direct current LVDC networks, the different converters being independent and isolated from each other, each converter being dedicated to one of the high voltage HVDC networks and to the low voltage direct current LVDC network,
a load designed to be powered in normal operation by the main generators and in backup operation by one of the low voltage direct current LVDC networks, the backup operation being put into place when at least one of the high voltage HVDC networks is no longer powered by the associated main generator in normal operation,
wherein the converters are reversible and in that in backup operation the load is powered in parallel by several of the high voltage direct current HVDC networks whose energy comes from the low voltage direct current LVDC networks.

Based on a structure of reversible HVDC/LVDC converters, it is possible to mutualize the backup and starting converters with the main converters needed for the providing of energy in normal operation. This makes it possible to not need dedicated converters for the backup or starting systems which would represent a significant dead weight penalizing the aircraft. Finally, certain applications such as the starting of the APU have very high power needs for short durations, and the system can parallelize several main converters for this operating phase, without penalizing their design for particular cases of overload.

The load is, for example, an auxiliary generator APU.

Advantageously, the converters each have a nonzero apparent output impedance defined so as to allow several converters to be placed in parallel without common control means for the different converters.

Each of the converters can be configured to limit the current strength which it is able to provide to a maximum value.

The apparent output impedance advantageously has an increase in value beyond a predefined current strength provided by the particular converter.

The electrical network can comprise between each of the high voltage direct current HVDC networks and the load, a secondary distribution enabling either isolating or connecting of the load and the high voltage direct current HVDC network in question. The load can be powered in parallel by several of the different high voltage direct current HVDC networks through the secondary distribution.

The electrical network advantageously comprises a control module for the secondary distribution configured to enable the closing of the contactors if the main generators are not providing power to the high voltage direct current HVDC networks.

The so-called first load utilizes a plurality of converters in parallel and the network can further comprise:
a plurality of second loads utilizing the converters independently of each other and designed to be powered separately by the high voltage direct current HVDC networks,
means of managing the priority between the first load and the second loads.

The second loads can be EBAC braking systems designed to brake the wheels of a landing gear of the airplane.

The electrical network can further comprise:
a plurality of batteries, each one connected to one of the low voltage direct current LVDC networks,
means of managing the load of the batteries making it possible to preserve a minimum charge sufficient to power the electric brakes.

The electrical network can further comprise:
an avionics system able to be connected in backup operation to one of the low voltage direct current LVDC networks,
at least one battery able to be dedicated to the avionics system.

BRIEF DESCRIPTION OF THE FIGURES

The invention will be better understood and other advantages will appear upon perusal of the detailed description of a sample embodiment, the description being illustrated by the enclosed drawing, in which.

For better clarity, the same elements are given the same reference numbers in the different figures.

DETAILED DESCRIPTION OF THE INVENTION

Figure 1:
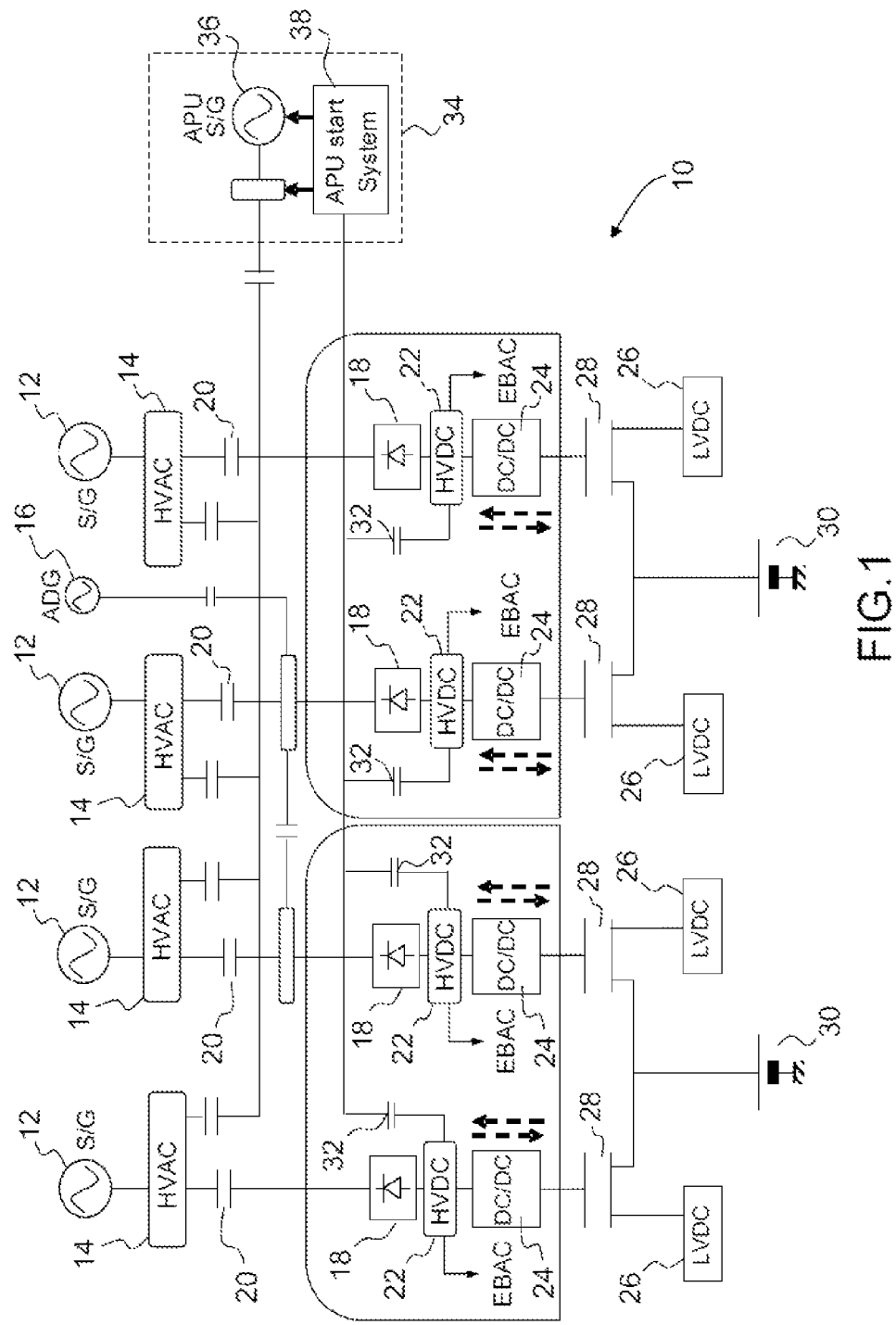
FIG. 1 shows an example of the electrical network according to the invention.

Generally speaking, in the following description of the present invention we shall distinguish two types of direct current network: high and low voltage, or HVDC and LVDC. The voltage most commonly used at present for HVDC networks is 540 V dc and it is 28 V dc for LVDC networks. Of course, the invention can be implemented regardless of the voltage values of these two types of network, the voltage of the high voltage network being greater than the voltage of the low voltage network.
Mutualisation of the Converters of the Network FIG. 1 shows an example of an electrical network 10 according to the invention which can be implemented in a jumbo jet having four main generators 12 each one able to put out an alternating voltage of 230 V to a main network HVAC 14. An Air Driven Generator (ADG) 16 can also put out, as a last backup, an alternating voltage of 230 V. Each of the HVAC networks 14 is associated with a rectifier 18 across a contactor 20 to form four high voltage direct current networks HVDC 540 V dc 22. The contactor 20 is realized, for example, from a MOS FET type power transistor or an electromechanical relay. In what follows, other contactors shall be described and they can be implemented with the same techniques. Each of the HVDC networks 22 is able to power particular loads using high voltage direct current HVDC, such as the flight controls or the electrical braking systems EBAC. In what follows, we shall only describe the powering of the electric brakes EBAC. Of course, one can generalize this use to any load connected to one of the HVDC networks and not requiring a power higher than the maximum power which can be put out by the particular network taken by itself.

Four dc/dc converters 24 make it possible to convert the voltages present on each of the HVDC networks 22 to form four low voltage direct current LVDC networks 26. Between each of the converters 24 and the corresponding LVDC networks 26, contactors 28 can switch the voltage coming from each of the converters 24 either to the corresponding LVDC network 26 or to a battery 30. The batteries 30 can be common to several LVDC networks 26. In the example shown, one battery 30 is common to two LVDC networks 26.

The invention is illustrated with four LVDC networks 26 and two batteries 30. Of course, it is possible to design a network according to the invention with a different number of batteries 30. For example, one can use one battery per LVDC network 26. Likewise, the number of LVDC networks can vary without leaving the scope of the invention. Moreover, the batteries 30 and the converters 24 and the rectifiers 18 can be grouped into an electric power plant situated in a precise location of the aircraft. It is likewise possible to distribute the different components of the electrical network spatially in the aircraft. The structure of the contactors should be adapted according to the number and the location of the batteries 30 of the converters 24 and the rectifiers.

We shall define two types of operation for the electrical network 10. A normal operation is effective when the main generators 12 are functioning and powering each of the HVDC networks 22. Each converter 24 is dedicated to one of the LVDC networks 26. The loads powered by one of the LVDC networks 26 cannot be powered by another of the LVDC networks 26. A backup operation is put in place when there is a malfunctioning of the main generators 12 or more generally when the HVDC networks 22 are no longer powered by the main generators, for example, in the event of a cut-off of a HVAC network 14 or in case of a fault in a rectifier 18.

In normal operation, the converters 24 are independent of each other. The converters 24 are electrically isolated from each other.

According to the invention, the converters 24 are reversible so as to allow the generating of high voltage HVDC from the LVDC networks 26. Thus, in backup operation, loads powered by the HVDC networks 22 can continue their operation as normal.

The electrical network 10 comprises another generator known as an auxiliary generator 34 or APU, used when the aircraft is on the ground or in flight when the main generators 12 are out of service. The APU generally comprises a turbine powered by the fuel of the aircraft and an alternator 36 making it possible to power the HVAC network(s) 14. The APU 34 has an electrical starting system 38 which can be powered by the batteries 30. In the prior art, the starting system 38 of the APU 34 has a dedicated converter drawing its energy directly from the batteries 30. According to the invention, the starting system 38 is powered in parallel by several of the HVDC networks 22 whose energy comes from LVDC networks 26 across converters 24. This is made possible by the fact that the converters 24 are bidirectional. Contactors 32 ensure the connecting of the different HVDC networks 22 to the starting system 38.

The invention enables the mutualisation of the converters 24 so as to optimize the weight and the volume of the conversion elements. Starting from the architecture of the prior art for the onboard LVDC systems on the airplane, the use of a modular conversion system allows a mutualizing of the backup converters dedicated to the electrical braking EBAC and the converters of the starting system 38 of the APU. First of all, the converters 24 perform similar conversion functions, transforming the LVDC into HVDC. Moreover, the mission statements of applications may be considered to be operationally complementary. Finally, the power needs are similar. For example, for a "twin-aisle aircraft" the four EBAC braking channels require a total power of the order of 16 kW during 1 min, whereas the starting of the APU requires a total power of around 15 kW during 45 sec. The complementary mission statements, the similarity in the nature of the conversion and the power demand render the braking and APU starting applications suitable candidates for the sharing of conversion resources. The modular conversion system enables sharing of the conversion resource between the different candidate users for the sharing. The distribution elements realize the switching of the energy of the sources to the consumers and the conversion elements are used to condition the energy into adequate forms for the users.

In normal operation, the four rectifiers 18 transform the main HVAC network into HVDC to power the EBAC braking system and the converters 24, putting out the LVDC. The converters function as a voltage step-down. The starting system of the APU is powered directly by one or more of the HVDC networks 22 connected in parallel.

In backup operation, the four converters 24 function as a voltage step-up and are used to convert the energy coming from the batteries 30 and to generate HVDC voltages, one for each of the HVDC networks 22.

Without leaving the scope of the invention, it is possible to change the number of batteries 30 and the allocation of the converters 24 in the different operating modes by adapting the control of the contactors 28 and 32.

The invention is described on the basis of loads such as the APU requiring the implementing of a plurality of converters connected in parallel and the electrical brakes EBAC using only a single converter 24 per braking channel. The invention can also be implemented for other aircraft loads. We simply distinguish the two types of load, one using only a single converter 24 and those requiring the implementation of a plurality of converters connected in parallel.

Likewise, the different loads requiring the implementing of a plurality of converters connected in parallel can each use different numbers of converters.

Figure 2:
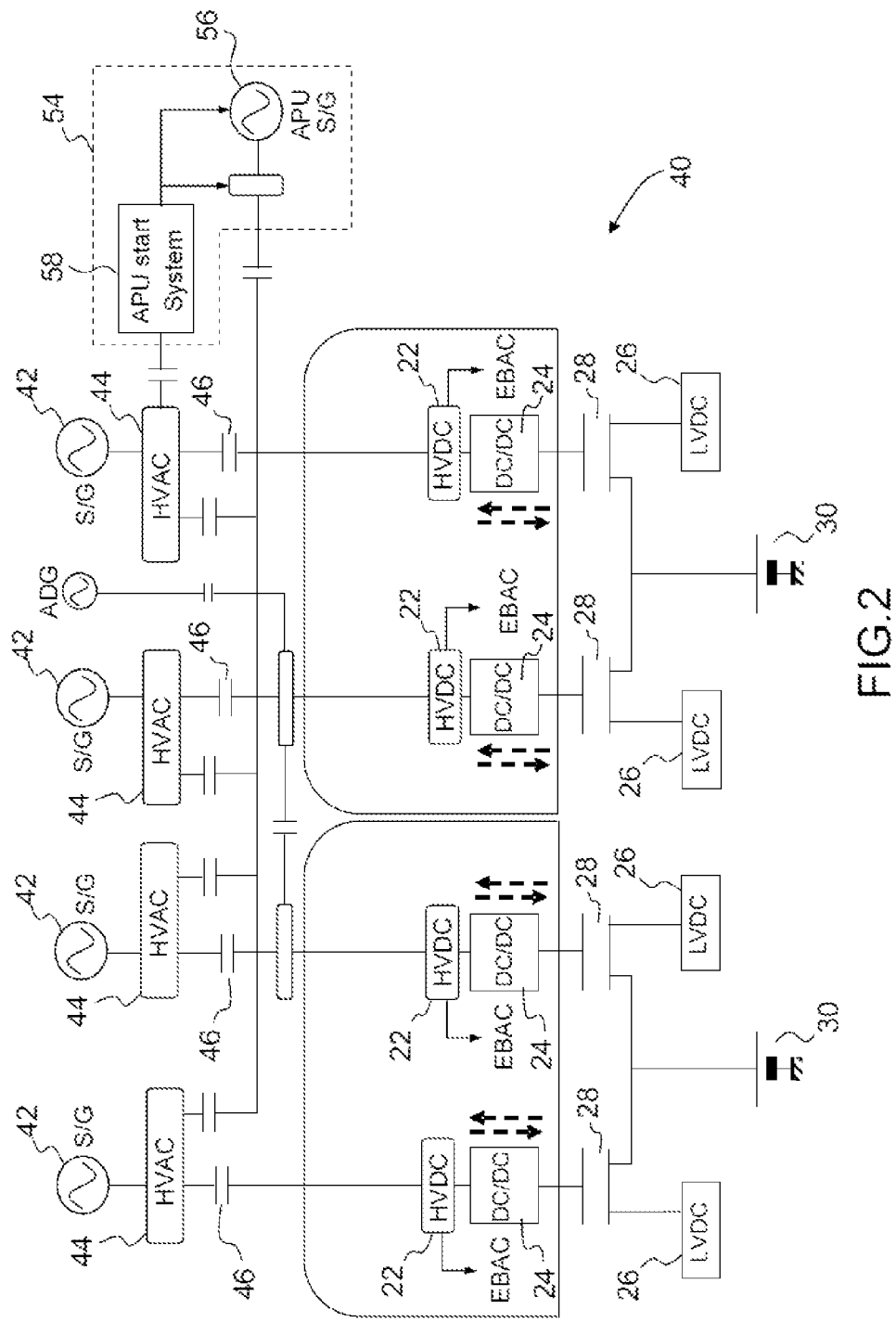
FIG. 2 shows a variant of the network of FIG. 1.

FIG. 2 shows an electrical network 40 in which four main generators 42 directly put out a dc voltage HVDC to four main HVDC networks 44, each one connected to the HVDC networks 22 through a contactor 46. In the electrical network 40, one finds the converters 24, the LVDC networks 26, the contactors 28 and the battery 30. The electrical network 40 also comprises an APU 54 whose starting system 56 is powered in normal operation by the main HVDC networks 44. Alternatively, still in normal operation, the starting system 56 can be powered by the HVDC networks 22. The APU 54 comprises a direct current generator 56 able to power the various main HVDC networks 44.

The backup operation of the electrical network 40 is similar to that of the network 10 of FIG. 1. The starting system 56 is powered in backup mode by the batteries 30 through converters 24.

Parallel Operation of the Converters and Independence

The parallel operation of the converters 24 is an important part of the invention. The parallel operating of converters 24 is difficult to accomplish, due to the sharing of current among the different parallel-operating converters. It is possible to provide a common control module for the different converters designed to work in parallel.

More precisely, a control of master/slave type makes it possible to send current set points derived by a central controller to all of the converters. The major advantage of this approach is an ideal sharing of current among the converters.

Nevertheless, in the field of aeronautics, it is important to preserve the greatest possible independence between the different networks and between the different converters. This independence is necessary for the operating safety and availability of the braking system. In fact, this system comprises four channels which it is desirable to keep as independent as possible. In the event of failure of one of the channels, the others can remain operational. An unavailability of a common control module for the different converters might entail a loss of all the converters and notably compromise all the channels of the braking system. Thus, it is hard to preserve the independence of the converters with this type of control. This requires a particular design for the common module, resulting in major cost increases to ensure a sufficient reliability.

What is more, the mutualizing of the converters for loads of different kind makes it hard to achieve an independence of the networks and the converters. Certain loads, like the EBAC braking systems, use the converters independently of each other and other loads like the starting system of the APU use a plurality of converters in parallel. The control modes of the parallel-operating converters should ensure a current sharing while preserving their independence.

More generally, independence in normal operation of the high voltage direct current HVAC networks with respect to the low voltage direct current LVDC 28 V dc networks is very important to the airplane safety. The loads directly powered with 28 V dc are for the most part critical loads to the airplane safety, such as, notably, the flight computers or the pilot screens. The loss of all 4 channels of conversions of HVAC to LVDC 28 V dc creates a major threat to the safety of the airplane and may significantly compromise the operation of the airplane. It is critical to preserve the independence in normal operation of the four channels so as not to create a common point liable to result in loss of the entire LVDC 28 V dc bus.

Advantageously, to preserve this independence, the converters 24 each have a nonzero apparent output impedance defined so as to allow a parallel operation of a plurality of converters 24 without a control means in common to the different converters 24. Such an impedance lets one balance out the current strength which each one puts out when the outputs of the converters 24 are connected. For example, the impedance is of resistive type. This non-ideal characteristic of the converters 24 enables a balancing of their output without any communication between the different converters and thus lets one preserve a total independence among converters when they are operating in parallel.

Figure 3:
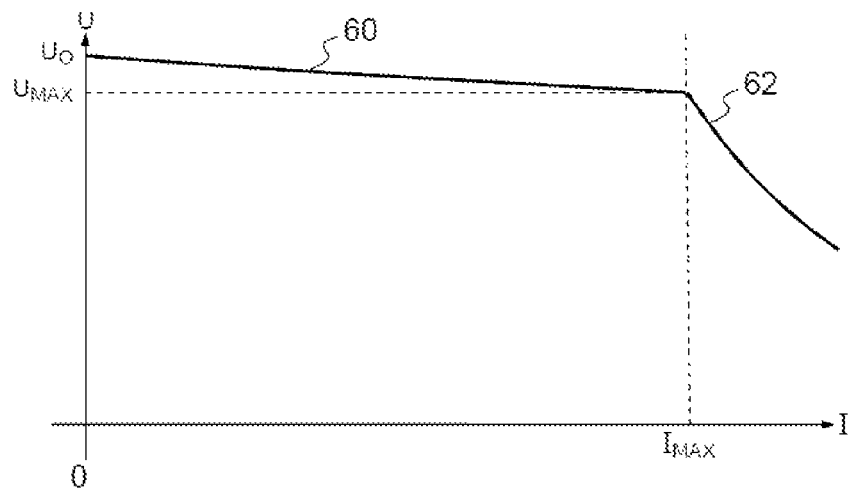
FIG. 3 shows a characteristic curve of a converter implemented in one of the networks of FIG. 1 or 2.

FIG. 3 shows, for a converter 24, its output voltage U as a function of the current strength I which it provides. In its operating range, when the current strength is less than a value $I_{MAX}$, the voltage U is decreasing. This decrease is comparable to that obtained with the presence of a nonzero output impedance. This impedance can be a resistor placed in series with the output of the converter. It is advantageously generated by the control means of the converter. In fact, the presence of a physical impedance degrades the efficiency of the network. The output voltage of the converter is indicated as $U_0$ for a zero output current and $U_{MAX}$ for the current $I_{MAX}$. The voltage $U_{MAX}$ is greater than the voltage $U_0$. An offset between the current strengths put out by the different converters 24 placed in parallel is inevitable. One makes sure to define the tolerances of the voltages $U_0$ and $U_{MAX}$ so that the current strengths put out by the different converters does not exceed a maximum permissible value so as to not risk damaging one of these converters 24 by excess current strength.

One can broaden the tolerances for the characteristics by limiting the maximum power which can be put out by one of the converters by means of increasing the apparent impedance beyond the current strength value $I_{MAX}$. More precisely, between a current strength of zero and IMAX the first part 60 of the curve shown in FIG. 3 shows a decrease which is constant, representative of a constant impedance. Beyond the current strength $I_{MAX}$, the second part 62 of the curve shows a greater slope, being representative of a stronger impedance. Thus, when a first one of the converters 24 reaches the current strength $I_{MAX}$, the supplemental power needed to power the load is furnished by the other converters 24 connected in parallel with the first.

Figure 4:
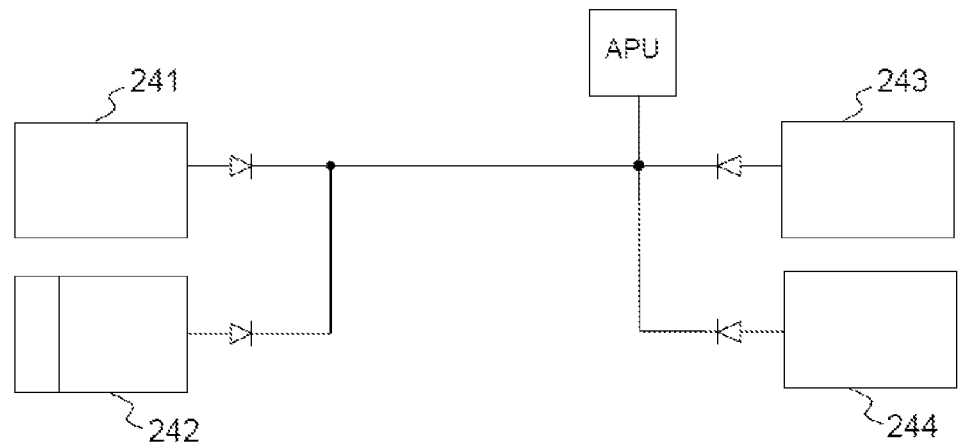
FIG. 4 shows a plurality of converters powering in parallel the same load.

FIG. 4 illustrates the limitation of power of four converters 24, referenced here 241, 242, 243 and 244, and powering the APU in parallel. The converters 241, 243 and 244 put out their maximum power and the converter 242 completes the power needed for the operation of the APU.

Figure 5:
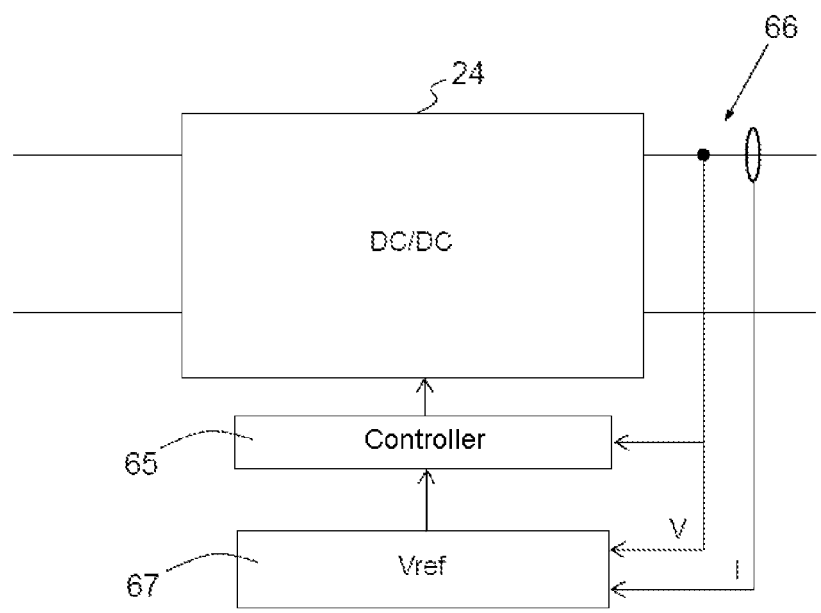
FIG. 5 shows the control of one of the converters powering in parallel the same load.

FIG. 5 shows schematically a converter 24 and its control means allowing for the generating of a nonzero apparent output impedance. The converter 24 comprises a plurality of electronic switches piloted by a controller 65, issuing to the switches orders to open and close so as to form a voltage V at the output 66 of the converter. The controller 65 receives the output voltage V and a reference voltage Vref. The controller 65 pilots the converter 24 by slaving the voltage V to the voltage Vref. For a zero output impedance, the voltage Vref is constant. On the other hand, in order to obtain a nonzero apparent output impedance, the voltage Vref is variable as a function of the current strength I put out at the output 66 of the converter 24. More precisely, a reference voltage generator 67 receives a measurement of the output voltage V and a measurement of the current strength I put out by the converter 24. The generator 67 puts out to the controller 65 a voltage Vref which is a function of the two measurements which it receives. The function is defined, for example, such that the current strength I and the voltage U follow the curve of FIG. 3. Other curves are possible, of course.

Management of Priorities

Figure 6:
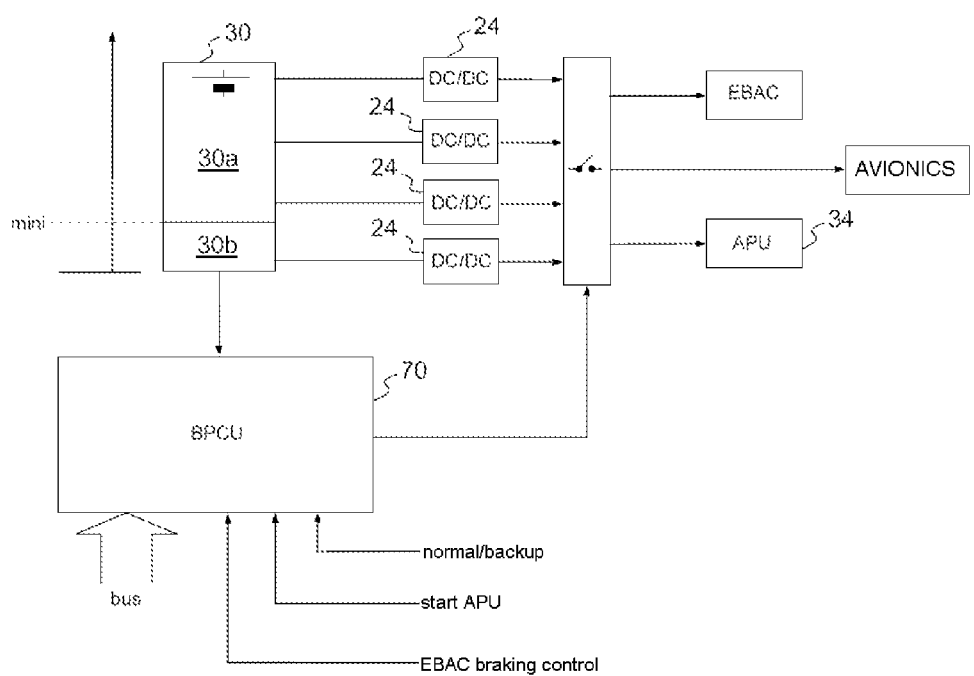
FIG. 6 shows schematically the control of the contactors of the network.

FIG. 6 shows schematically the control of the different contactors of the electrical network. This control is used for the two types of networks 10 or 40. We are interested in the control of the starting system of the APU and the electric brakes EBAC.

The converters 24 are dynamically shared between the braking system EBAC and the starting system of the APU as a function of the operating modes of the airplane system. The difference in criticality between the two loads (critical for the brake, essential for the APU starting) requires an arbitration of the priorities between the two loads in the event of a simultaneous demand. The management of priorities for the sharing of conversion resources is done at the network level by the control of a secondary distribution comprising essentially the contactors 32 in the variant of FIG. 1. A priority management module 70 can be implemented as an independent unit or in a network management element already present in the aircraft and known as a Bus Power Control Unit (BPCU). The module 70 receives different information, including the level of charge of the battery or batteries 30, the operating mode: normal or backup, the request by the pilot to start the APU, the control of the EBAC braking. Other information can arrive at the module 70 by a bus. The module 70 pilots the secondary distribution and notably the contactors 32.

During the braking phases, the converters 24 are allocated to the braking system EBAC with full priority, the starting system of the APU being deactivated and unable to operate while the braking system is activated. The converters 24 are disconnected from the braking system only during the phases when the braking system is not active and the starting system of the APU can then be activated.

When the APU starting system is activated and the EBAC braking system is inactive, the secondary distribution connects in parallel the four converters 24 to the APU starting system. If the EBAC braking system is activated during a starting of the APU, the EBAC braking system takes priority at once and the starting of the APU is aborted by means of the secondary distribution. The converters 24 are immediately made available to the EBAC braking system, while the APU starting system is suspended.

The EBAC braking system and the APU starting system potentially share, besides the conversion resources 24, the same energy stockpile in the form of the battery or batteries 30. In FIG. 5, a single battery 30 is shown. In practice, as for example represented in FIGS. 1 and 2, there may be several distinct batteries 30 whose overall charge is monitored overall.

The difference in criticality between the two applications, the EBAC braking system and the APU starting system, also requires an arbitration of the priorities between the two systems in terms of access to the backup energy available in the battery 30 in an emergency situation. In the event of the backup operation, the pilot of the aircraft may try to restart the APU several times, possibly completely discharging the battery 30 if the system does not prevent this. The EBAC braking system being a critical function necessary to ensuring the landing of the aircraft in total safety, it is paramount to guarantee that the amount of energy needed for its operation is reserved in the case of the backup operation. In this operating mode, the battery 30 is virtually partitioned into two subpartitions 30a and 30b, 30a for the APU starting system and 30b entirely reserved to the EBAC braking system. Depending on the energy available in the battery 30, the module 70 can interdict the powering of the APU starting system and preserve the energy needed for the EBAC braking system.

Powering of Avionic Systems

The converters 24 use the battery 28 V dc 30 for the EBAC braking and APU starting system. These two loads form high-power loads requiring a network quality adapted in terms of low voltage and temporary voltage drop. It should be possible to extract the maximum possible power from the battery 30 to power this type of load.

The aircraft furthermore has a system known as the avionics system including loads of computer type. It primarily involves flight and navigational instruments implementing calculators which requires a particular electrical power supply. In backup operation, it is possible to power the loads of avionics type with the same battery as the high-power loads. Even so, the extracting of major power from the battery may lower its voltage below a tolerance threshold for loads of avionics type.

Advantageously, the avionics loads are powered by one of the dedicated batteries 30 with a network quality adapted to loads of computer type. The decoupling of the high-power loads and the avionics type loads makes it possible to optimize the characteristics of the batteries by letting the high-power loads extract the maximum power without constraint of minimum voltage as imposed by the avionics type loads. The avionics loads are thus isolated from any perturbations created by the high-power loads (temporary voltage drop, voltage decrease, etc.).

For example, in the case of a battery having a rated voltage of 28 V dc, the low voltage threshold for loads of avionics type can be set at 25 V dc. A battery designed to provide 15 kW with a voltage min of 20 V dc is only able to provide 10 kW with a voltage min of 25 V dc. Assuming 15 kW to be the demand during the starting of the APU and 5 kW the demand of the avionics loads. In the cases when the batteries are permanently mutualized between the high-power and avionics loads, two batteries of 10 kW with a minimum voltage of 25 V dc are necessary. On the other hand, in the case when one battery is used for the high-power loads and one battery for the avionics loads, a battery of 15 kW with a voltage min of 20 V dc (equivalent to a battery of 10 kW with a voltage min of 25 V dc) is needed for the high-power loads and a battery of 5 kW with a voltage min of 25 V dc for the avionics type loads. Thus, this enables a significant optimization of the weight and volume of the onboard batteries, reducing the need for onboard power and capacity.

The allocation of one of the batteries 30 to the avionics loads can be done in dynamic manner by the module 70. More precisely, as long as the overall charge of the batteries 30 enables a powering of the high-power loads without voltage drop below the tolerance threshold of the avionics loads, one will keep all of the batteries 30 mutualized. As soon as the overall charge of the batteries 30 requires a major voltage drop, the module 70 isolates one battery 30 to reserve it for the avionics loads and uses the remaining batteries 30 for the high-power loads.

The dynamic allocation can authorize in a critical situation, beyond the backup battery operation, a halting of the allocation of one battery dedicated to the avionics loads in order to reassign it to the high-power loads. More precisely, one can authorize the loss of the avionics systems in the event of extreme need for electrical braking EBAC.

The invention claimed is:

1. An electrical network of an aircraft comprising:
several main generators,
several high voltage direct current HVDC networks, each one powered by one of the generators in normal operation,
several low voltage direct current LVDC networks, each one powered by one of the high voltage direct current HVDC networks,
several converters to transfer energy from one of the high voltage direct current HVDC networks to one of the low voltage direct current LVDC networks, the different converters being independent and isolated from each other, each converter being dedicated to one of the high voltage HVDC networks and to the low voltage direct current LVDC network,
a load designed to be powered in normal operation by the main generators and in backup operation by one of the low voltage direct current LVDC networks, the backup operation being put into place when at least one of the high voltage HVDC networks is no longer powered by the associated main generator in normal operation,
in which the converters are reversible and in backup operation the load is powered in parallel by several of the high voltage direct current HVDC networks whose energy comes from the low voltage direct current LVDC networks.

2. The electrical network according to claim 1, in which the load is an auxiliary generator APU.

3. The electrical network according to claim 1, in which the converters each have a nonzero apparent output impedance defined so as to allow several converters being placed in parallel without common control means for the different converters.

4. The electrical network according to claim 3, in which the apparent output impedance has an increase in value beyond a predefined current strength provided by the particular converter.

5. The electrical network according to claim 1, in which each of the converters is configured to limit the current strength which it is able to provide to a maximum value.

6. The electrical network according to claim 1, further comprising, between each of the high voltage direct current HVDC networks and the load, a secondary distribution comprising a plurality of contactors and enabling either isolating or connecting of the load and the high voltage direct current HVDC network in question and in which the load can be powered in parallel by several of the different high voltage direct current HVDC networks through the secondary distribution.

7. The electrical network according to claim 6, further comprising a control module for the secondary distribution configured to enable the closing of the contactors if the main generators are not providing power to the high voltage direct current HVDC networks.

8. The electrical network according to claim 1, in which the first load utilizes a plurality of converters in parallel and the network further comprises:
   a plurality of second loads utilizing the converters independently of each other and designed to be powered separately by the high voltage direct current HVDC networks,
   means of managing the priority between the first load and the second loads.

9. The electrical network according to claim 8, in which the second loads are EBAC braking systems designed to brake the wheels of a landing gear of the airplane.

10. The electrical network according to claim 9, furthermore further comprising:
    a plurality of batteries, each one connected to one of the low voltage direct current LVDC networks,
    means of managing the load of the batteries making it possible to preserve a minimum charge sufficient to power the electric brakes.

11. The electrical network according to claim 1, further comprising:
    an avionics system able to be connected in backup operation to one of the low voltage direct current LVDC networks,
    at least one battery able to be dedicated to the avionics system.

* * * * *